United States Patent
Zhao et al.

(10) Patent No.: US 8,949,178 B2
(45) Date of Patent: Feb. 3, 2015

(54) METHOD AND SYSTEM FOR EFFICIENT DATA SYNCHRONIZATION

(75) Inventors: Lin Zhao, Hangzhou (CN); Hai Wang, Hangzhou (CN); Qing Zhang, Hangzhou (CN); Yina Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 255 days.

(21) Appl. No.: 12/653,091

(22) Filed: Dec. 8, 2009

(65) Prior Publication Data

US 2010/0145910 A1  Jun. 10, 2010

(30) Foreign Application Priority Data

Dec. 10, 2008  (CN) .......................... 2008 1 0179394

(51) Int. Cl.
*G06F 17/00* (2006.01)
*G06F 17/30* (2006.01)
*G06F 7/00* (2006.01)

(52) U.S. Cl.
CPC ...... *G06F 17/30348* (2013.01); *G06F 17/3056* (2013.01); *G06F 17/30592* (2013.01)
USPC .......................................... 707/610; 707/717

(58) Field of Classification Search
CPC .................... G06F 17/30575; G06F 17/30457
USPC ............ 707/610, 613, 999.001–999.005, 717
See application file for complete search history.

(56) References Cited

U.S. PATENT DOCUMENTS

| 5,333,299 | A |   | 7/1994  | Koval et al. |
|-----------|---|---|---------|--------------|
| 5,778,389 | A |   | 7/1998  | Pruett et al. |
| 5,822,588 | A |   | 10/1998 | Sterling et al. |
| 5,848,405 | A | * | 12/1998 | Norcott ................. 707/999.001 |
| 5,950,198 | A |   | 9/1999  | Falls et al. |
| 6,101,507 | A |   | 8/2000  | Cane et al. |
| 6,108,653 | A |   | 8/2000  | Pereira |
| 6,122,640 | A |   | 9/2000  | Pereira |
| 6,289,357 | B1 |   | 9/2001  | Parker |
| 6,345,313 | B1 |   | 2/2002  | Lindholm |
| 6,353,835 | B1 | * | 3/2002  | Lieuwen ................. 707/999.203 |
| 6,397,125 | B1 |   | 5/2002  | Goldring et al. |
| 6,430,577 | B1 |   | 8/2002  | Hart |

(Continued)

FOREIGN PATENT DOCUMENTS

CN    1426244 A     6/2003
JP    S62257535    11/1987

(Continued)

OTHER PUBLICATIONS

Sachin Kulkarni, Mukesh Mohania, Concurrent Maintenance of Views Using Multiple Versions, Proceedings of the 1999 International Symposium on Database Engineering & Applications, p. 254, Aug. 2-4, 1999.*

(Continued)

*Primary Examiner* — Kannan Shanmugasundaram
(74) *Attorney, Agent, or Firm* — Van Pelt, Yi & James LLP

(57) ABSTRACT

Data synchronization includes establishing a plurality of target data tables based on a source data table in which data to be synchronized is stored, determining a current target data table from the plurality of target data tables, synchronizing the source data table and the current target data table, and directing an application server to access the current target data table upon successful completion of synchronization.

15 Claims, 10 Drawing Sheets

(56) References Cited

U.S. PATENT DOCUMENTS

| | | |
|---|---|---|
| 6,643,671 B2 | 11/2003 | Milillo et al. |
| 6,973,452 B2 * | 12/2005 | Metzger et al. ........ 707/999.004 |
| 7,003,531 B2 | 2/2006 | Holenstein et al. |
| 7,500,246 B2 | 3/2009 | Saake et al. |
| 7,680,767 B2 * | 3/2010 | Adya et al. ............. 707/999.002 |
| 7,873,684 B2 | 1/2011 | Souder et al. |
| 8,108,389 B2 | 1/2012 | Bobick et al. |
| 2002/0059299 A1 * | 5/2002 | Spaey ........................ 707/104.1 |
| 2004/0015783 A1 * | 1/2004 | Lennon et al. ................. 715/523 |
| 2005/0010564 A1 * | 1/2005 | Metzger et al. ................... 707/3 |
| 2005/0050019 A1 * | 3/2005 | Schwartz et al. ................. 707/3 |
| 2005/0193028 A1 | 9/2005 | Oswalt |
| 2005/0251633 A1 * | 11/2005 | Micka et al. .................. 711/162 |
| 2006/0047696 A1 * | 3/2006 | Larson et al. ............. 707/103 R |
| 2006/0236056 A1 | 10/2006 | Nagata |
| 2007/0033236 A1 | 2/2007 | Kaneko et al. |
| 2008/0126407 A1 | 5/2008 | Shimaoka et al. |
| 2008/0281972 A1 * | 11/2008 | Gupta et al. .................. 709/228 |

FOREIGN PATENT DOCUMENTS

| | | |
|---|---|---|
| JP | 2001166976 | 6/2001 |
| JP | 2002202906 | 7/2002 |
| JP | 2004355203 | 12/2004 |
| JP | 2006099748 | 4/2006 |

OTHER PUBLICATIONS

Second Examination Report for CN Application 200810179394.6, mailed Jun. 15, 2011.
Third Examination Report for CN Application 200810179394.6, mailed Sep. 8, 2011.

* cited by examiner

METHOD AND SYSTEM FOR EFFICIENT DATA SYNCHRONIZATION

CROSS REFERENCE TO OTHER APPLICATIONS

This application claims priority to People's Republic of China Patent Application No. 200810179394.6 entitled DATA SYNCHRONIZATION METHOD AND DEVICE filed Dec. 10, 2008 which is incorporated herein by reference for all purposes.

FIELD OF THE INVENTION

The present invention relates to the field of computers and in particular to a data synchronization method and system.

BACKGROUND OF THE INVENTION

In large electronic-commerce websites, it is often required to synchronize the data in a backend data warehouse with a frontend database, such as an ORACLE™ database for Online Transaction Processing (OLTP) for the purpose of processing queries by a frontend application server.

The ORACLE™ database includes an undo/rollback table space. Raw data that affects data lines is stored in the undo/rollback table space when a session performs Update and Delete operations in a Data Manipulation Language (DML) on the database. When another session accesses these data lines before the session in question has been committed, the session will receive indication that the data has been modified but not yet committed and thus will retrieve the raw data from the undo/rollback table space in accordance with stored undo/rollback address information. The occupied rollback segment will not be released until the session in question is committed or until the rollback is finished.

FIG. 1 is a diagram illustrating a typical data synchronization technique. In this example, table t1 is a table residing in a frontend OLTP ORACLE™ database, the Data Warehouse (DW) is a backend data warehouse, and the Application server retrieves data from table t1. A typical data synchronization technique is as follows (all the following commands are executed at the frontend database): in the first step, data in a user table t1 is deleted using a command such as delete from schema1.tablename and the deleted data is temporarily stored in an undo/rollback table space; in the second step, data is retrieved from a user table t2 of the backend data warehouse and inserted into the user table t1 using a command such as insert into schema1.tablename select*from schema2.tablename@lnk_dw and synchronized but uncommitted data is also temporarily stored in the undo/rollback table space; in the third step, the data is committed; in the fourth step, data is rolled back if an abnormality occurs. Since the ORACLE™ database is adopted for both the frontend and the data warehouse, the data can be imported/exported directly via a database link. For example, lnk_dw used in the second step of the above steps represents a database link.

In the above data synchronization technique, all operations of the same data service are performed on the same table, that is, a table in the backend data warehouse corresponds to a table in the frontend database. As such, a large amount of data has to be stored in the undo/rollback table space during operation. The following drawbacks exist in the existing technique:

(1) In the above steps, a significant portion of the undo/rollback table space is used in the first and second steps, which tends to cause problems. If, for example, the undo/rollback table space is exhausted, then other normal DML operations such as "Insert", "Update" and "Delete" invoked during the normal course of a service may be affected. If the undo/rollback table space is fully occupied in a peak period, then respective DML statements sent from the application server to the database will have to wait, thus causing the connection pool at the server to be fully occupied. Consequently, an increasing number of incoming requests to the application server will have to wait for connections and a vicious cycle follows, wherein resources such as memory on the application server becomes exhausted, causing the application server to stop functioning normally.

(2) The execution of the first and second steps can take a long time. During this time, if any abnormality occurs, the fourth rollback step will be executed. The resulting system has poor error tolerance. When there is a large amount of data to be rolled back, the rollback operation can take a long period to perform, thus degrading the performance of a production database.

(3) Data synchronization is inefficient, primarily because of the deletion operation of the first step.

(4) It is difficult to resume a broken transport.

(5) Data synchronization progress cannot be easily monitored.

As the amount of data to be synchronized increases, the undo/rollback table space of the frontend ORACLE™ database is likely to be fully occupied, causing the performance of the system to be negatively impacted.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
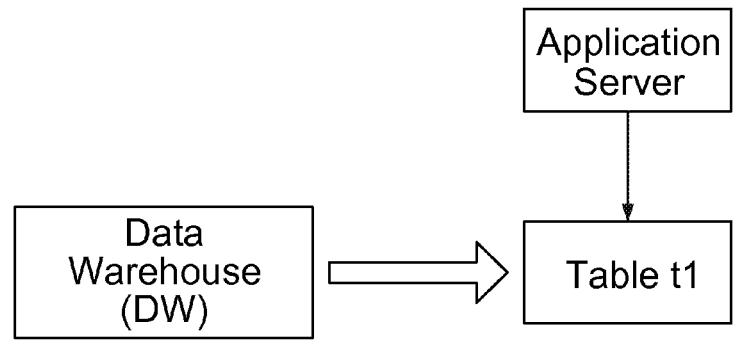
FIG. 1 is a diagram illustrating a typical data synchronization technique.
Figure 2:
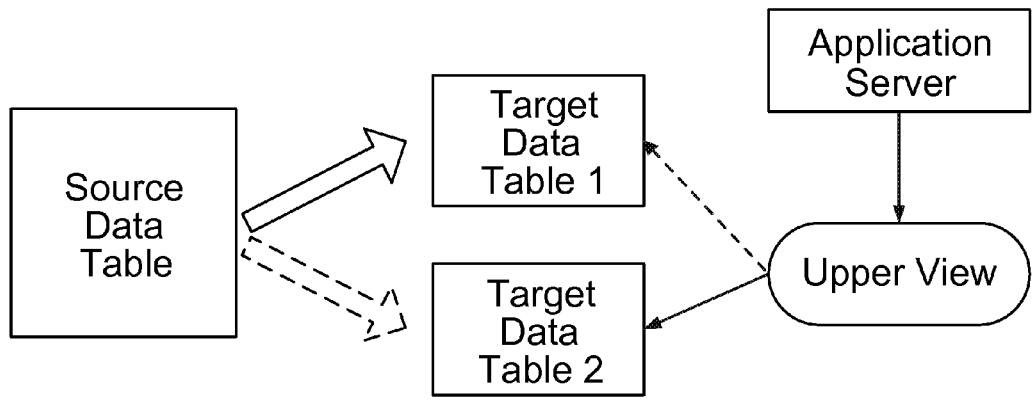
FIG. 2 is a diagram illustrating an embodiment of a data synchronization system.

FIG. 2 is a diagram illustrating an embodiment of a data synchronization system. For the same data service, two or more target data tables (the target data table 1 and the target data table 2 illustrated in FIG. 2) are established in advance. The target data tables correspond to a source data table in which data to be synchronized is stored. In this example, each source data table corresponds to two target data tables, which are used alternately. The source data table and target data tables can reside in a backend data warehouse or in a frontend database such as ORACLE™. Alternatively, the source data table can be reside in the backend data warehouse and the target data tables can reside in the frontend database or vice versa:

In this example, an upper view is established in advance to facilitate target data table access by the application server. The upper view may be established on the database server, on the application server, or on other appropriate device. In some embodiments, the upper view is implemented as a pointer, a handle, or other appropriate reference to a target data table. In some embodiments, the upper view is implemented as a function that returns a pointer or reference to the target data table. The application server accesses the target data table pointed to or referenced by the upper level. As shown in FIG. 2, for example, when the upper view points to the target data table 1, the application server can access data in the target data table 1 through the upper view. Meanwhile, target data table 2 is not accessed; thus, if there is data in the source data table that should be synchronized, it can be synchronized with the target data table 2. Similarly, when the upper view points to target data table 2, the application server can access data in the target table 2 through the upper view. Since the target data table 1 is not accessed at this time, data in the source data table that needs to be synchronized can be synchronized with the target data table 1. This way, the data synchronization process and the data access process are performed on separate tables and conflicts are eliminated.

Figure 3:
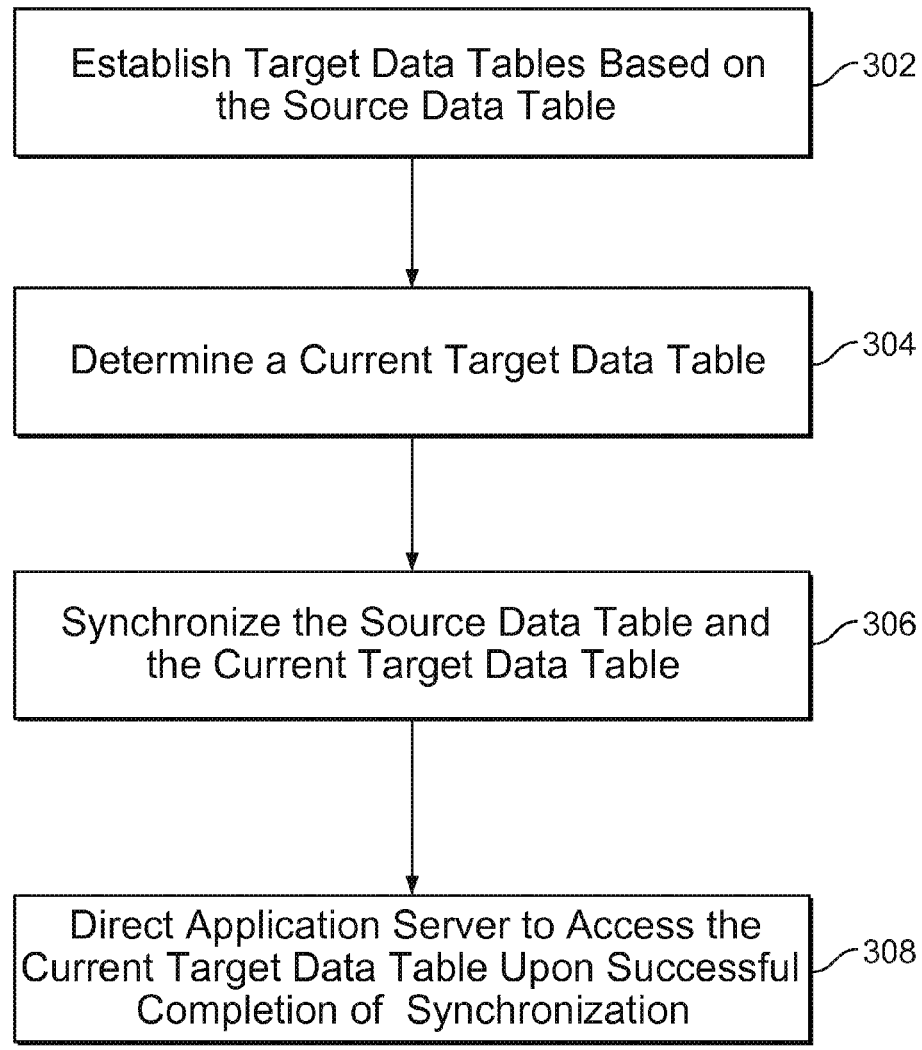
FIG. 3 is a flowchart illustrating an embodiment of a data synchronization process for synchronizing data between a source data table and a target data table.

FIG. 3 is a flowchart illustrating an embodiment of a data synchronization process for synchronizing data between a source data table and a target data table. The process may be implemented on a server such as a web server, a database server, or any other appropriate device that interacts with both the database and the application server.

At 302, two or more target data tables are established based on the source data table according to the technique described above in connection with FIG. 2. At 304, a current target data table is determined from the previously established target data tables. In some embodiments, to determine a current target data table, the number of data records in each target data table is counted. The target data table with no records is deemed to be the current table. An arbitrary table is chosen if more than one target data table has zero records. However, if no target data table has zero records, then an abnormality has occurred and the data synchronization flow is terminated.

At 306, the source data table and the determined current target data table are synchronized. In some embodiments, when the data is synchronized from the source data table into the determined current target data table, the data can be copied or updated directly into the determined current target data table (i.e., the original null target data table). In some embodiments, the original null target data table is dropped, a new target data table is recreated as the current target data table, and the data is copied into the newly recreated current target data table.

In some embodiments, the following command is used to create a target data table:

create table t2 as select*from schema2.tablename@lnk_dw;

The operation of the command is a compound operation. One operation is the DDL (to create a table t2) and the other operation is data synchronization. ORACLE™ will take it as a DDL operation which occupies substantially no undo/rollback table space. Additionally, a parallel prompt can be adopted and a specific command is as follows:

create table t2 as select/*+parallel (dw_t2, 4)*/*from schema2.tablename@lnk_dw dw_t2;

wherein /*+parallel (dw_t2, 4)*/ in the above command denotes a scan over the table dw_t2 with four processes.

The use of such a scheme can further reduce the likelihood that an undo/rollback table space is fully occupied and can improve the efficiency of data synchronization to some extent.

At 308, an application server is directed to access the current target data table upon successful completion of data table synchronization. In some embodiments, the upper view is updated whenever the data synchronization successfully completes. The updated upper view points to the target data table into which the data is newly imported to ensure that the application server can smoothly access the data synchronized into the target data table.

In some embodiments, an operation of clearing the non-current target data table (i.e., the target data table that is not subject to data synchronization) is also executed upon successful completion of data synchronization.

A detailed example will be presented below to illustrate data synchronization between a source data table in a backend data warehouse and a target data table in a frontend ORACLE™ database. Two data tables are established in the frontend database for the same data service, that is, the source data table in the backend data warehouse corresponds to the two target data tables (table t1 and table t2) in the frontend database, which are alternately used.

Figure 4:
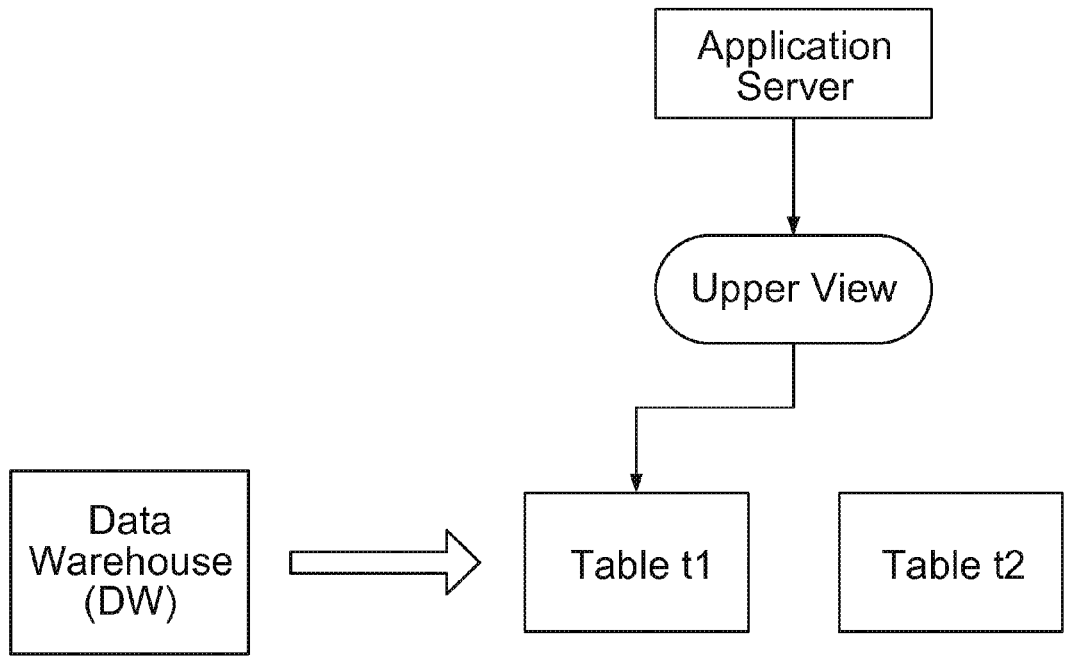
FIG. 4 illustrates an example in which the application server accesses table t1, and data is synchronized from the back end data warehouse into null table t2.
Figure 5:
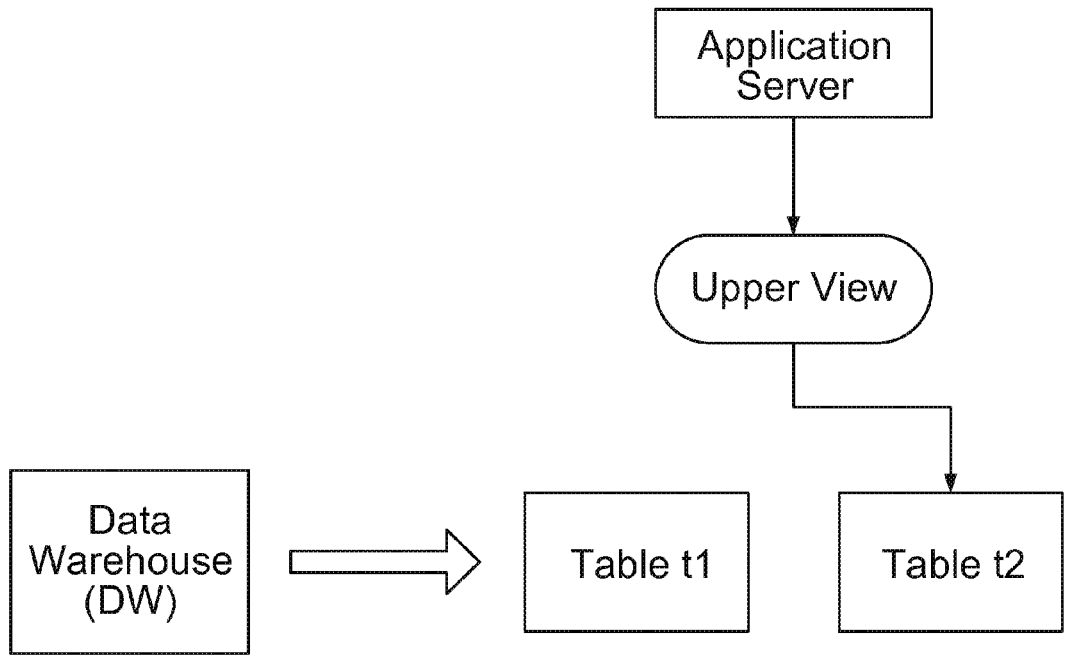
FIG. 5 illustrates an example in which an application server accesses table t2 and data is synchronized from the back end data warehouse into null table t1.

The synchronization scheme is illustrated in FIG. 4 and FIG. 5. FIG. 4 illustrates an example in which the application server accesses table t1, and data is synchronized from the back end data warehouse into null table t2. FIG. 5 illustrates an example in which an application server accesses table t2 and data is synchronized from the back end data warehouse into null table t1.

In FIG. 4 and FIG. 5, the data warehouse (DW) corresponds to a backend data warehouse, table t1 and table t2 correspond to two data tables in a frontend database. The tables correspond to the same data service. A data table in the backend data warehouse corresponds to the two data tables (t1 and t2) in the frontend database. Thus, data can be synchronized from the table in the backend data warehouse into table t1 or table t2.

The application server determines whether to access data in table t1 or table t2 based on whether the upper view points to t1 or t2. Accordingly, the application server accesses the data in table t1 through the upper view if the upper view points to table t1 or, if the upper view points to table t2, the application server accesses table t2 through the upper view.

In some embodiments, there is a time interval (or referred to as a preset data synchronization period) that is used to periodically synchronize the data. For example, some systems are configured to perform daily data synchronization from the data warehouse to the front end ORACLE™ database. For data synchronization, table t1 and table t2 are examined to locate the null table, into which synchronized data is loaded (i.e., copied).

In FIG. 4, the application server accesses a table t1, data is synchronized into a null table t2, and an upper view is redefined upon completion of data synchronization to point to table t2. The following command is executed to clear data in table t1.

truncate table t1;

Since the operation of Truncate is different in principle from the operation of Delete, the use of the former can appear much faster.

After the data is synchronized into table t2 and the upper view is redefined, the application server accesses the data in table t2 and data is synchronized into the null table t1 when the data is for synchronization next time. FIG. 5 illustrates a case that an application server accesses a table t2 and data is synchronized into a null table t1. An upper view is redefined upon completion of data synchronization to point to table t1 and then the following command is executed:

truncate table t2;

The data in table t2 is cleared.

Figure 6:
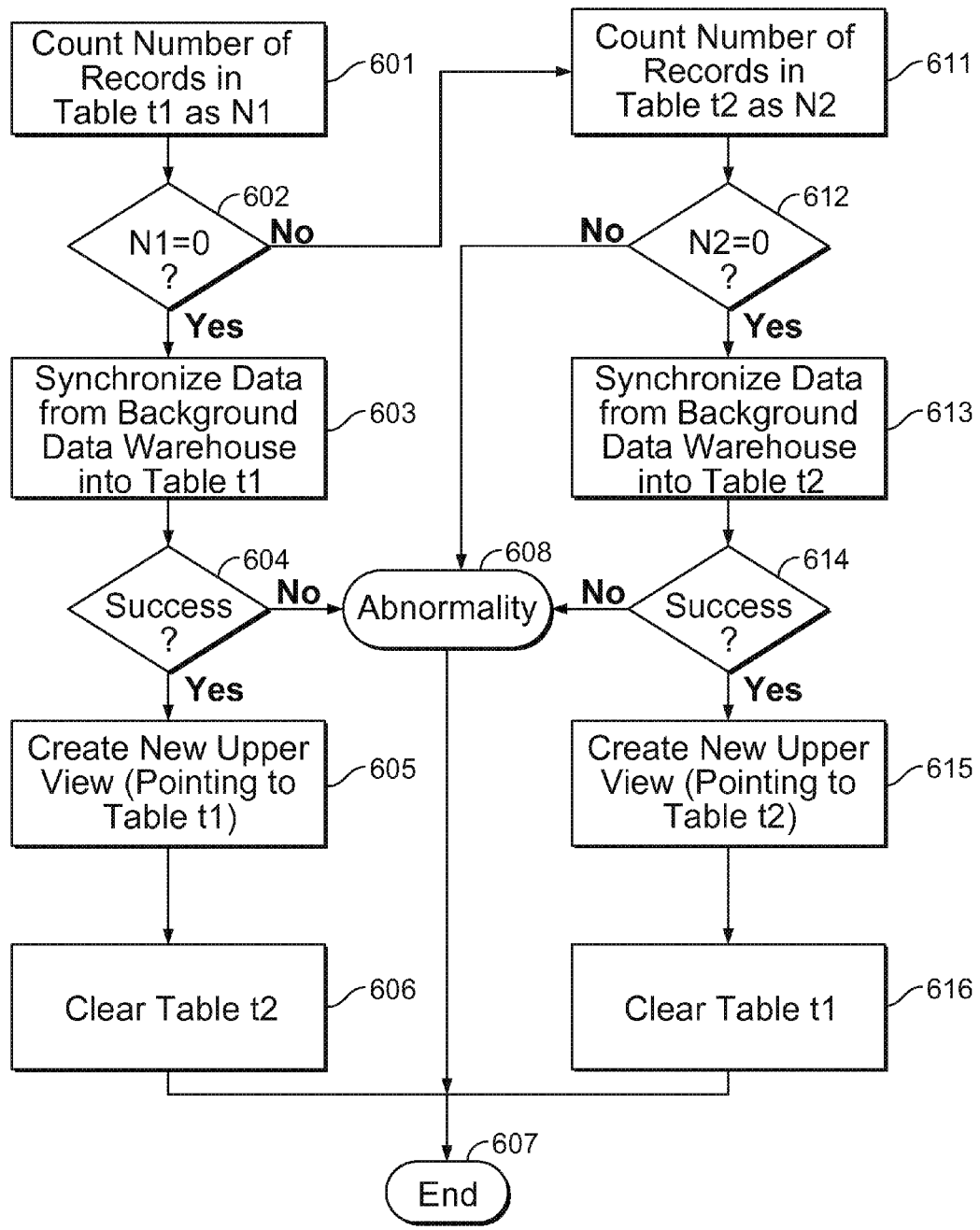
FIGS. 6 and 7 are flowcharts illustrating embodiments of the data synchronization process for synchronizing data between a source data table (e.g., a data table in a backend data warehouse) and a target data table (e.g., a data table in a frontend ORACLE™ database).
Figure 7:
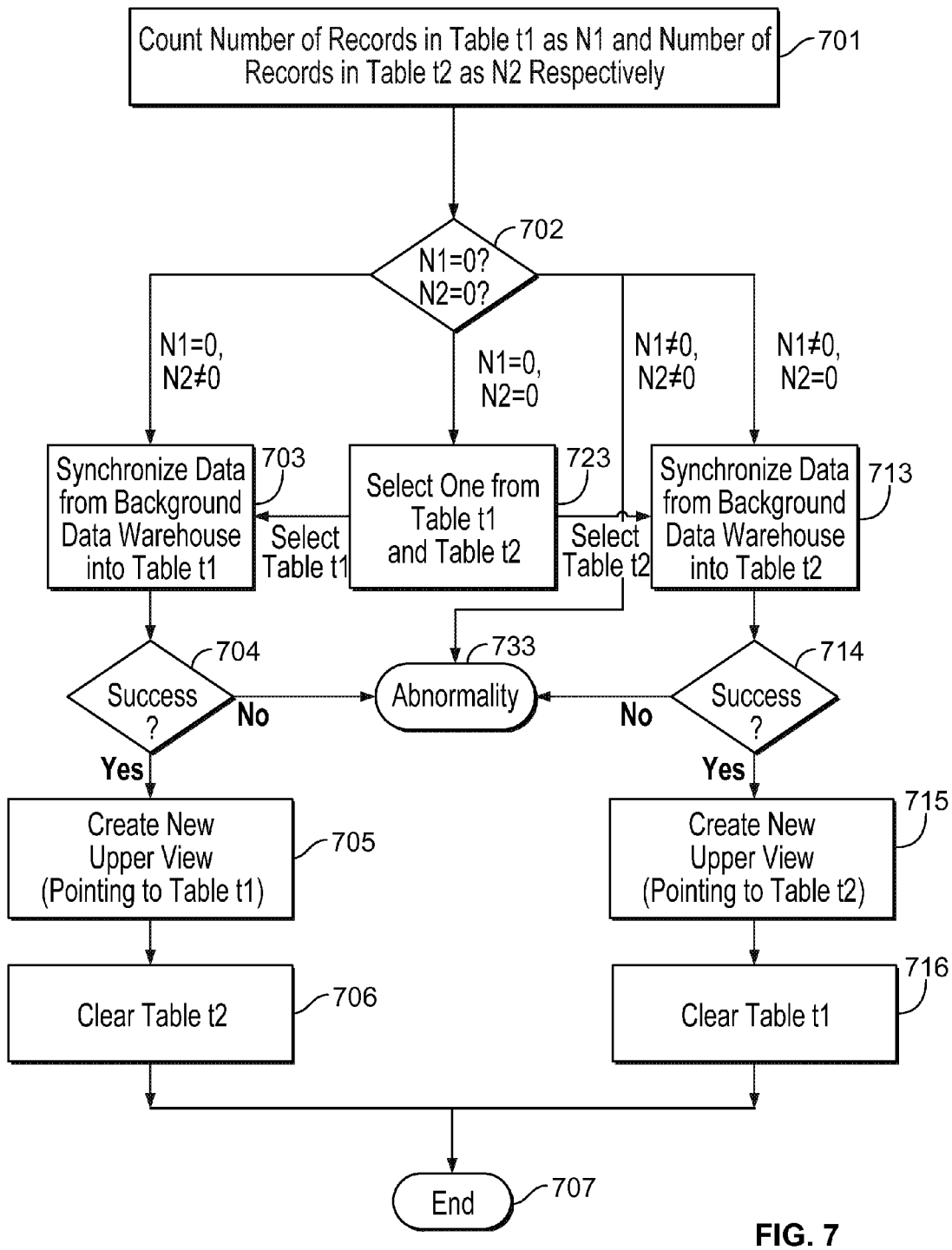

FIGS. 6 and 7 are flowcharts illustrating embodiments of the data synchronization process for synchronizing data between a source data table (e.g., a data table in a backend data warehouse) and a target data table (e.g., a data table in a frontend ORACLE™ database). The examples assume that target data table t1 and target data t2 have been established previously. The processes illustrated in the embodiments below may be executed on a web server, a database server, or other appropriate device.

In FIG. 6, the numbers of records in the two target data tables are determined sequentially. When the number of records in one of the target data tables is determined as zero, it is not necessary to determine the number of records in the other target data table. At 601, the number of records in table t1 is counted and the result is stored as N1. In some embodiments, the number of records in table t1 is counted and stored in a variable N1 using the following command:

Select count (*) into N1 from t1 where rownum<2;

where rownum denotes data records and rownum<2 indicates that as long as at least one record is detected in the data table, presence of data can be determined without further detection of any additional data records.

At 602, it is determined whether there is any data in table t1. In this example, whether there is any data in table t1 is determined by determining whether the counted number N1 of records is equal to zero. If so, the process proceeds to 603 for synchronization; otherwise, the process proceeds to 111 to determine whether table t2 has any data.

At 603, the data is synchronized and loaded from the backend data warehouse into table t1. In various embodiments, the data is synchronized using various synchronization methods, such as a segment-wise commitment method supported by ORACLE™ EXTENT.

At 604: it is determined whether synchronization is successful. If so, 605 is executed; otherwise, 608 is executed to handle abnormality. When an abnormality occurs, the data synchronization process is terminated. Warning and/or log messages are optionally generated.

At 605, a new upper view is created. The new upper view is created to point to table t1 so that an application server can access the data in table t1 through the upper view.

At 606, a clear operation is performed on table t2. In some embodiments, the above command of truncate table is used when the clear operation is performed on table t2 to rapidly delete the old data and clear table t2.

At 607, the data synchronization process ends.

At 611, the number of records in table t2 is counted and the value is stored in a variable N2.

The number of records in table t2 is counted and stored as N2 using the following command:

Select count (*) into N2 from t2 where rownum<2.

At 612, it is determined whether there is any data in table t2; in other words, whether the counted number N2 of records is equal to zero. If so, the process proceeds to 613 to perform data synchronization; otherwise, the presence of data in both tables indicates an abnormality and the process proceeds to 608 for handling the abnormality.

At 613, the data is synchronized and loaded from the backend data warehouse into table t2. In various embodiments, the data is synchronized using various synchronization methods, such as a segment-wise commitment method supported by ORACLE™ EXTENT.

At 614, it is determined whether the synchronization is successful. If so, the process proceeds to 615; otherwise, there is an abnormality and the process proceeds to 608 to handle the abnormality.

At 615, a new upper view is created. Upon successful completion of data synchronization, an upper view is recreated which points to the table that has been synchronized, i.e., table t2, so that the application server can access the data in table t2 through the upper view.

At 616, a clear operation is performed on table t1. In some embodiments, the above-mentioned truncate command is executed to rapidly delete the old data and clear table t1.

At 607, the process terminates.

In FIG. 7, the numbers of records in the two target data tables are counted simultaneously and one of the target data tables with the number of records being zero is selected.

At 701, the number of records in table t1 and those in table t2 are counted respectively as N1 and N2.

Number of records in table t1 and those in table t2 can still be counted respectively as N1 and N2 in the above way of rownum<2 during processing and a specific command line is as follows:

Select count (*) into N1 from t1 where rownum<2;
Select count (*) into N2 from t2 where rownum<2.

At 702, it is determined whether there is any data in table t1 and table t2. In some embodiments, it is determined whether the number N1 of records in table t1 and the number N2 of records in table t2 are equal to zero.

N1=0 and N2≠0 indicates there is no data in table t1 and there is data in table t2, thus the process proceeds to 703.

At 703, the data is synchronized from the backend data warehouse into table t1.

At 704, it is determined whether synchronization is successful. If so, the process proceeds to 705; otherwise, the process proceeds to 733 to handle the abnormal condition.

At 705, a new upper view is created. The new upper view is created to point to table t1 so that an application server can access the data in table t1 through the upper view.

At 706, a clear operation is performed on table t2. In some embodiments, the truncate command described above is used to implement the clear operation.

The process terminates at 707.

N1≠0 and N2=0 indicates there is data in table t1 and there is no data in table t2, thus the process proceeds to 713.

At 713, the data is synchronized from the backend data warehouse into table t2.

At 714, it is determined whether synchronization is successful. If so, the process proceeds to 715 to create a new upper view; otherwise, an abnormality has occurred and the process proceeds to 733 to handle the abnormality.

Upon successful completion of data synchronization, an upper view is recreated at 715 to point to the synchronized data table t2 so that an application server can access the data in table t2 through the upper view.

At 716, a clear operation is performed on table t1.

The process terminates at 707.

N1=0 and N2=0 indicates there is no data in table t1 and there is no data in table t2, then the process proceeds to 723.

At 723, a data table is selected from table t1 and table t2. This can be an arbitrary selection. If table t1 is selected, then 703-707 are performed. If table t2 is selected, then 713-716 and 707 are performed.

N1≠0 and N2≠0 indicates there is data in table t1 and there is data in table t2. This is considered an abnormal condition. The process proceeds to 733 to handle the abnormality and the process terminates.

Figure 8:
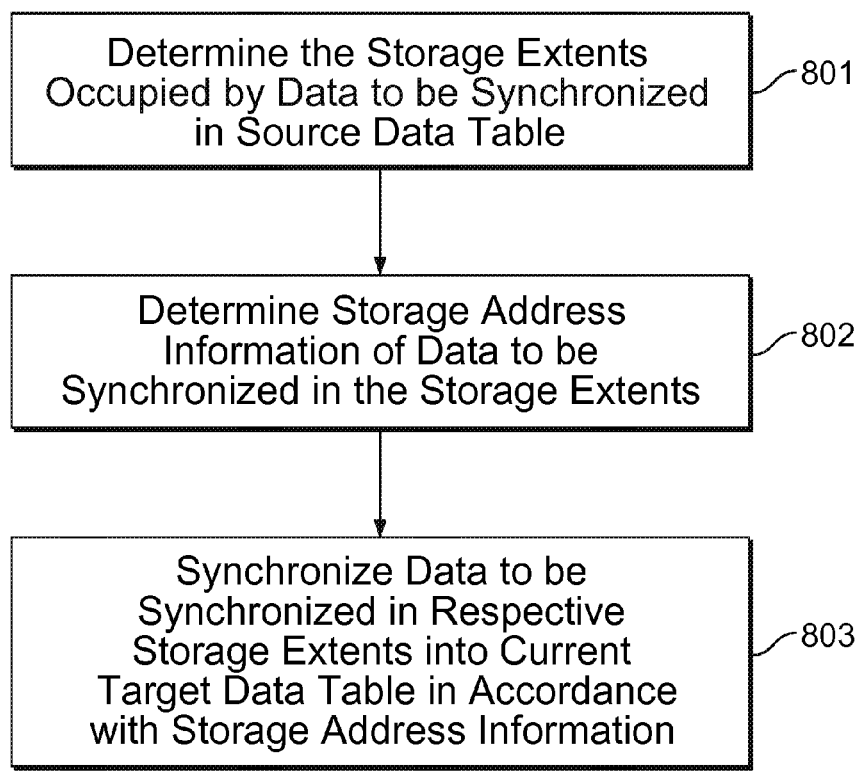
FIG. 8 is a flowchart illustrating an embodiment of a process for synchronizing the source data table and the current target data table.

FIG. 8 is a flowchart illustrating an embodiment of a process for synchronizing the source data table and the current target data table. The process may be used to implement 603 and 613 of FIG. 6 and 703 and 713 in FIG. 7.

At 801, the storage extents occupied by the data to be synchronized in the source data table are determined. In some embodiments, a data dictionary view of the ORACLE™ database is queried to obtain the storage extents occupied by the data to be synchronized in the source data table.

At 802, the storage address information of the data to be synchronized in the above storage extents is determined, where the storage address information includes at least an address range of the data to be synchronized in the respective storage extents. A minimum address (e_min_rowid) and a maximum address (e_max_rowid) at which the data to be synchronized is stored in the respective storage extents is calculated from the storage extents occupied by the data to be synchronized in the source data table, which are derived from the data dictionary view of the ORACLE™ database. In some embodiments, the derived address range over is saved in an intermediate table, e.g., a table of tmp_rowid. An example table structure of the intermediate table is as follows:

```
create table tmp_rowid
(
    id number;
    ROWID_MIN VARCHAR2 (100),
    ROWID_MAX VARCHAR2 (100)
);
```

The address information of the data to be synchronized in the respective storage extents in the source data table is retrieved by querying the intermediate table if necessary.

At 803, the data to be synchronized in the respective storage extents is synchronized into the current target data table in accordance with the storage address information. If synchronizing the data in a storage extent fails, then the process of synchronizing the data in the storage extent is reinitiated and will end when the number of times of being reinitiated exceeds a preset threshold.

Several ways of performing the synchronization are possible. For example, in a first embodiment the data in the respective storage extents is synchronized sequentially into the current target data table in one data synchronization process in accordance with the storage address information; and in a second embodiment the determined storage extents are divided into N groups, N corresponding data synchronization processes are initiated and in each of the data synchronization processes, the data in the respective storage extents in the corresponding one of the groups is synchronized sequentially into the current target data table in accordance with the storage address information. The second embodiment typically requires the ORACLE™ database. The second embodiment uses an upper view to separate the application server from specific data. The data table in the frontend ORACLE™ database to which data is synchronized from the data warehouse is not the same as any table currently used by the system, e.g., any table in which data currently invoked by the application server is located. Since data synchronization from the data warehouse to the data table in the frontend ORACLE™ database and the operation of invoking the data by the application server are not performed on the same data table, conflicting access due to these operations is eliminated.

Figure 9:
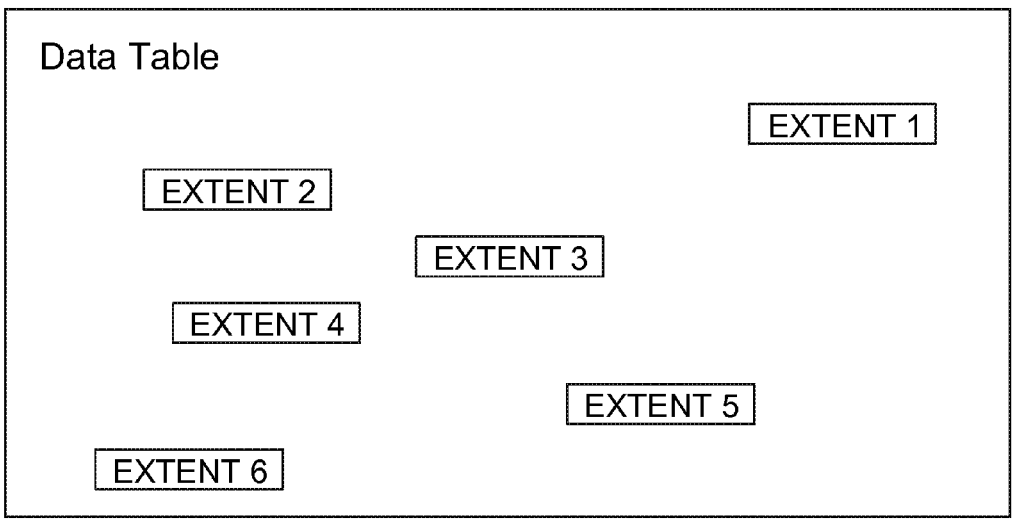
FIG. 9 is a diagram illustrating an embodiment of a storage format.

Further, data storage in the ORACLE™ database has the following features:

A data table in the ORACLE™ database includes numerous storage extents, each including consecutive blocks with a fixed size in which data is stored. An extent is the minimum unit of the data table space and one extent and another extent may not be continuous in terms of their physical locations. However, inside each extent there are a series of blocks which have continuous physical addresses. The storage format thereof is as illustrated in FIG. 9.

In the event that a data synchronization process has no conflict with an access process of the application server, based on the above features of data storage in the ORACLE™ database, data to be synchronized can be segment-wise committed, that is, the data synchronization procedure can be enabled in the second embodiment, without any influence on accuracy of data accessed by the service system and with an improved speed of data synchronization.

Figure 10:
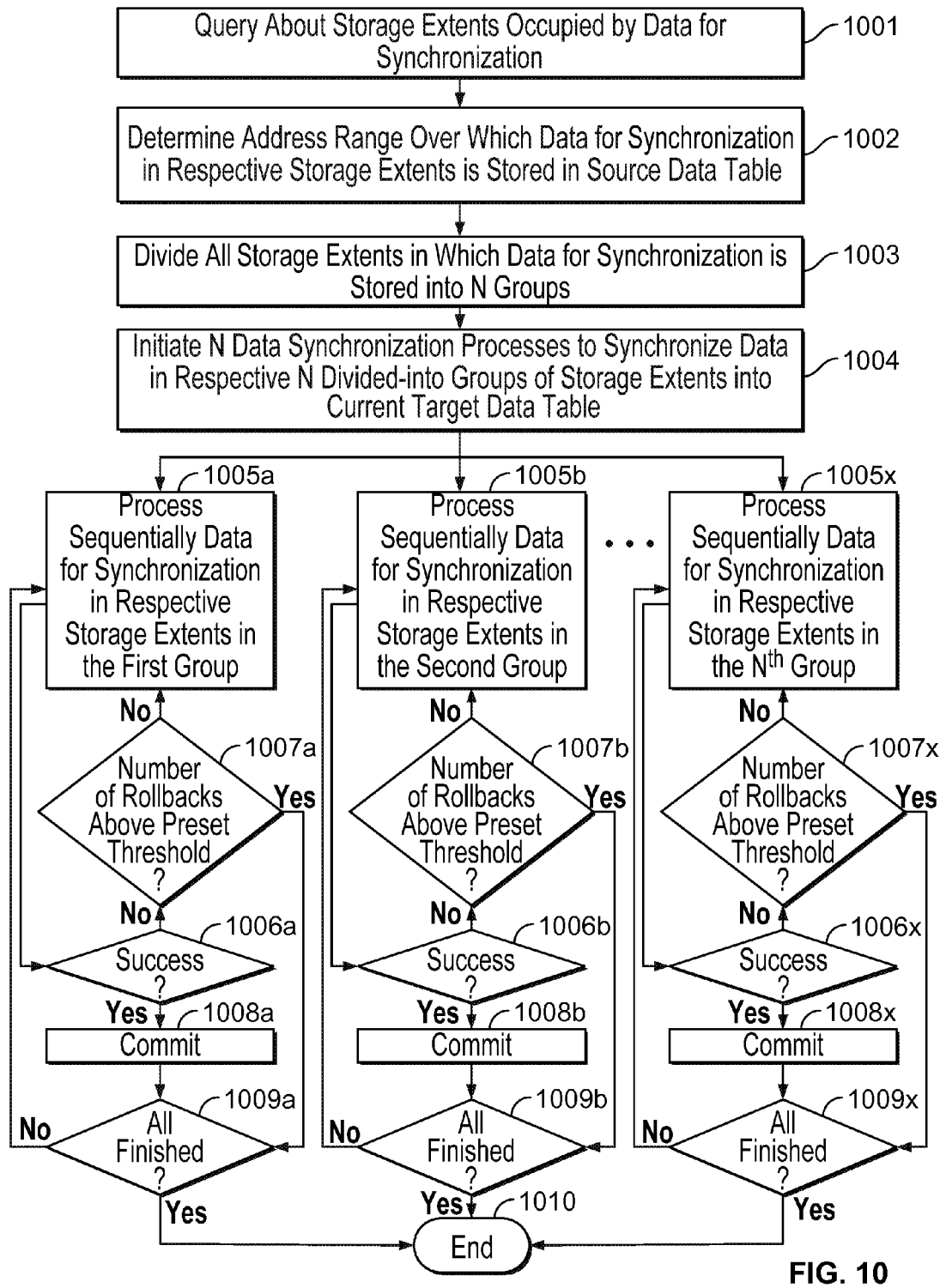
FIG. 10 is a flowchart illustrating an embodiment of a process for synchronizing data in a segment-wise way from a source data table to a current target data table.

FIG. 10 is a flowchart illustrating an embodiment of a process for synchronizing data in a segment-wise way from a source data table (e.g., a backend data warehouse) to a current target data table (e.g., a frontend table t1 or t2).

At 1001, a query is made about storage extents occupied by the data to be synchronized. In some embodiments, a data dictionary view of the backend data warehouse in which the source data table is located is queried to derive the storage extents occupied by the data to be synchronized in the source data table.

At 1002, an address range of the data to be synchronized in each storage extent in the source data table is determined. In some embodiments, the address range is determined by querying a stored intermediate table, e.g., a table of tmp_rowid.

At 1003, the storage extents in which the data to be synchronized is stored are divided into N groups.

The data in the table of tmp_rowid can be grouped in numerous ways, for example, divided into N groups by identifier (ID) modulus. The data is then processed by group.

At 1004: N data synchronization processes are initiated to synchronize the data in the respective N divided-into groups of storage extents into the current target data table.

The data is processed in parallel in the N data synchronization processes, where the respective processes correspond to the respective groups of storage extents. The synchronization processes simultaneously execute without conflicts. The use of parallel processing for synchronization of the data in the respective storage extents improves the efficiency of data synchronization.

At 1005*a*, the data to be synchronized in the respective storage extents in the present group (e.g., the first group) is sequentially processed. In some embodiments, the data to be synchronized in one of the storage extents in the present group is processed and upon reception of a message acknowledging successful synchronization, a process of synchronizing the data in the next storage extent in the present group is initiated.

At 1006*a*, it is determined whether synchronization is successful. In some embodiments, it is determined whether the data to be synchronized in the present storage extent is synchronized successfully. If so, then 1008*a* is executed; otherwise, a rollback is required to execute again the procedure of synchronizing the data in the storage extent and 1007*a* is executed.

At 1007*a*, it is determined whether the number of rollbacks exceeds a preset threshold. In some embodiments, a threshold for the number of rollbacks (i.e., retries) is preset and the number of retries is counted. If the number of retries is greater than the preset threshold, then no further retry will be made and the loop exits while an indication is generated to indicate the failure of synchronizing the data in the storage extent. The retry policy is adopted in the data synchronization procedure to improve error tolerance of data synchronization. If the number of retries is less than the preset threshold, then the flow returns to execute again 1005*a* of resynchronizing the data in the storage extent into the target data table; otherwise, 1009*a* is executed and the failure indication is generated if necessary.

If the data in the present storage extent is synchronized successfully, then at 1008*a*, the synchronized data is committed to the target data table.

At 1009*a*: It is determined whether processing is finished, that is, it is determined whether all the storage extents in the present group have been processed. If so, then it indicates that the corresponding data in all the storage extents in the group is synchronized and the process terminates. Failure indication is generated if needed. If the processing is not finished, in other words, the corresponding data in all the storage extents in the group has not been synchronized, then the flow returns to execute 1005*a* of synchronizing the data in the next storage extent in the group.

A counter variable v_done_num can be set for each of the groups during parallel processing to indicate correspondingly the number of storage extents in the group for which data synchronization is finished to thereby facilitate calculation of a speed at which each process synchronizes the data and of an overall speed of data synchronization. The efficiency of data synchronization can also be monitored conveniently based upon the above statistics.

The steps 1005*b*-1009*b* are a procedure of synchronizing sequentially the data in the respective storage extents in the second group. The steps 1005*x*-1009*x* are a procedure of synchronizing sequentially the data in the respective storage extents in the $N^{th}$ group. Additional steps may exist in the flowchart for intermediate groups.

The processing flows of the steps 1005*b*-1009*b*, the steps 1005*x*-1009*x*, and any intermediate steps are correspondingly identical to that of the steps 1005*a*-1009*a* and repeated descriptions thereof will be omitted here.

At 1010: The data synchronization process terminates.

In the above data synchronization procedure from a source data table into a target data table, if multiple processes are adopted for parallel processing so that the data in multiple data extents is processed at a time, then the data in these data extents can be committed to the target data table during a single commit operation to reduce the number of commit operations and further improve the speed and efficiency of committing the data to be synchronized. The number storage extents to be processed simultaneously can be adjusted dependent upon a practical implementation.

The above procedures of synchronizing data from a source data table into a current target data table presented in FIGS. 8-10 can be separately applicable in other procedures in which data is required for synchronization from a source data table into a target data table but will not be limited to an application presented in the data synchronization procedures presented in the embodiments of the invention.

Figure 11:
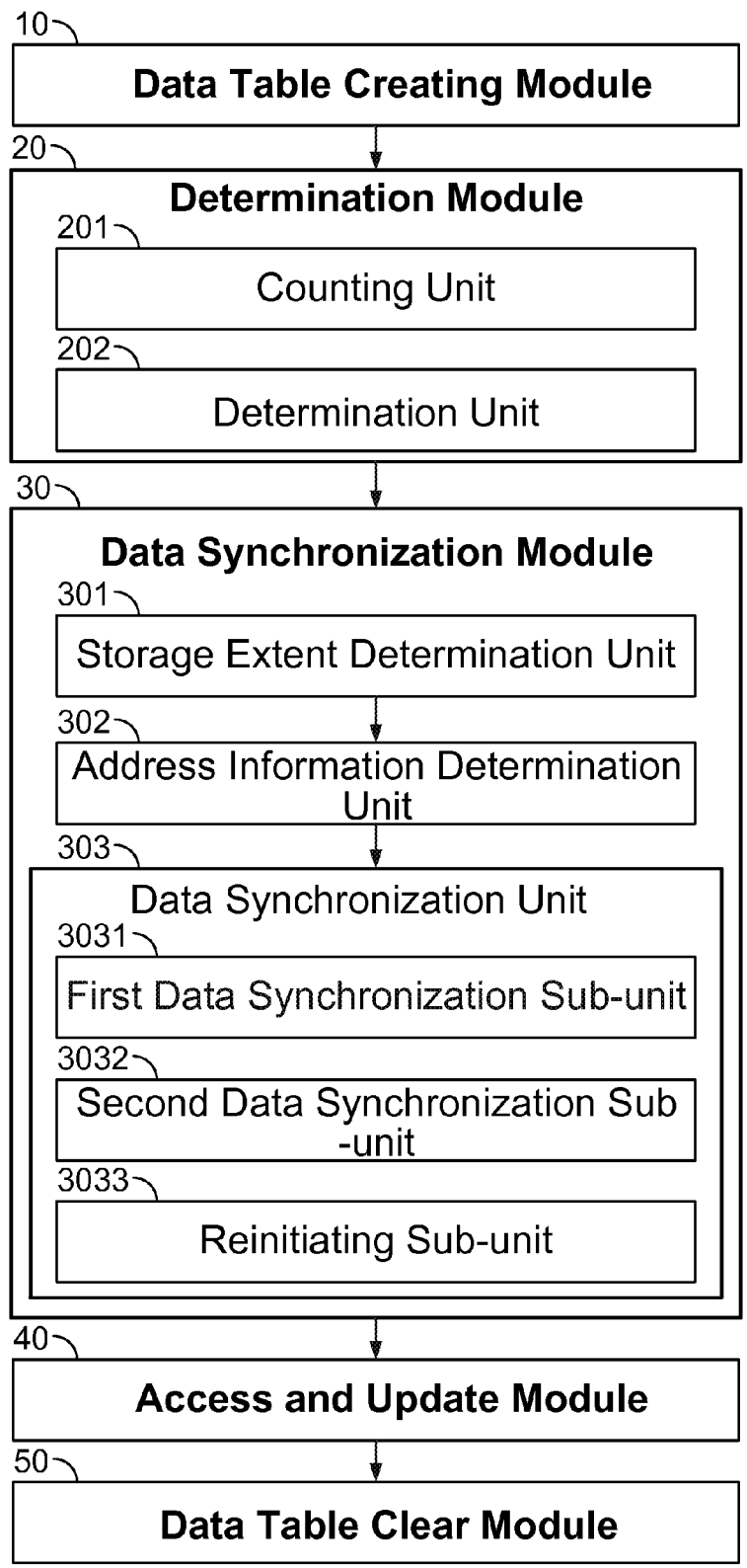
FIG. 11 is a block diagram illustrating a data synchronization system.

According to the above data synchronization method in the embodiments of the invention, a data synchronization device can be constructed as illustrated in FIG. 11, which includes a data table creating module 10, a determination module 20, a data synchronization module 30 and an access and update module 40. The modules can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules may be implemented on a single device or distributed across multiple devices. The functions of the modules may be merged into one another or further split into multiple sub-modules.

In this example, the data table creating module 10 is adapted to create in advance two target data tables corresponding to a source data table in which data to be synchronized is stored.

The determination module 20 is adapted to determine a current target data table from the two target data tables.

Preferably, the determination module 20 can further include a counting unit 201 and a determination unit 202.

The counting unit 201 is adapted to count respective data records in the two target data tables.

The determination unit 202 is adapted to determine one of the target data tables with the number of data records counted by the counting unit 201 being zero as the current target data table.

The determination unit 202 is further adapted to show an abnormality and end the data synchronization flow when neither of the numbers of data records in the two target data tables counted by the counting unit 201 is zero.

The data synchronization module 30 is adapted to synchronize the data from the source data table into the current target data table determined by the determination module 20.

Preferably, the data synchronization module can further include a storage extent determination unit 301, an address information determination unit 302, and a data synchronization unit 303.

The storage extent determination unit 301 is adapted to determine several storage extents occupied by the data to be synchronized in the source data table.

The address information determination unit 302 is adapted to determine storage address information of the data to be synchronized in the respective storage extents.

The data synchronization unit 303 is adapted to synchronize the data to be synchronized in the respective storage extents into the current target data table in accordance with the storage address information determined by the address information unit 302.

Preferably, the data synchronization unit 303 can further include a first data synchronization sub-unit 3031 and a second data synchronization sub-unit 3032.

The first data synchronization sub-unit 3031 is adapted to synchronize sequentially the data in the respective storage extents into the current target data table in one data synchronization process in accordance with the storage address information determined by the address information determination unit 302.

The second data synchronization sub-unit 3032 is adapted to divide the storage extents into N groups, to initiate N corresponding data synchronization processes, and to synchronize sequentially in each of the data synchronization processes the data in the respective storage extents in the corresponding one of the groups into the current target data table in accordance with the storage address information determined by the address information determination unit 302.

The data synchronization unit 303 further includes a reinitiating sub-unit 3033 adapted to reinitiate the procedure of synchronizing the data in a storage extent when the synchronizing failed and to end the procedure of synchronizing the data in the storage extent when the number of times of being reinitiated exceeds a preset threshold.

The access and update module 40 is adapted to enable an application server to turn to access the current target data table determined by the determination module 20 when the data synchronization module 30 synchronizes the data successfully.

The access and update module 40 is particularly adapted to create in advance an upper view so that the application server can access through the upper view one of the target data tables to which the upper view points and to update the upper view to enable the upper view to point to the current target data table upon completion of data synchronization.

The above data synchronization device further includes a data table clear module 50 adapted to clear the other of the two target data tables which is not subject to data synchronization when the data synchronization module 30 synchronizes the data successfully.

The data synchronization module 30 in the above data synchronization device can be arranged as a separate means for data synchronization and can be separately used in any data transfer procedure.

Figure 12:
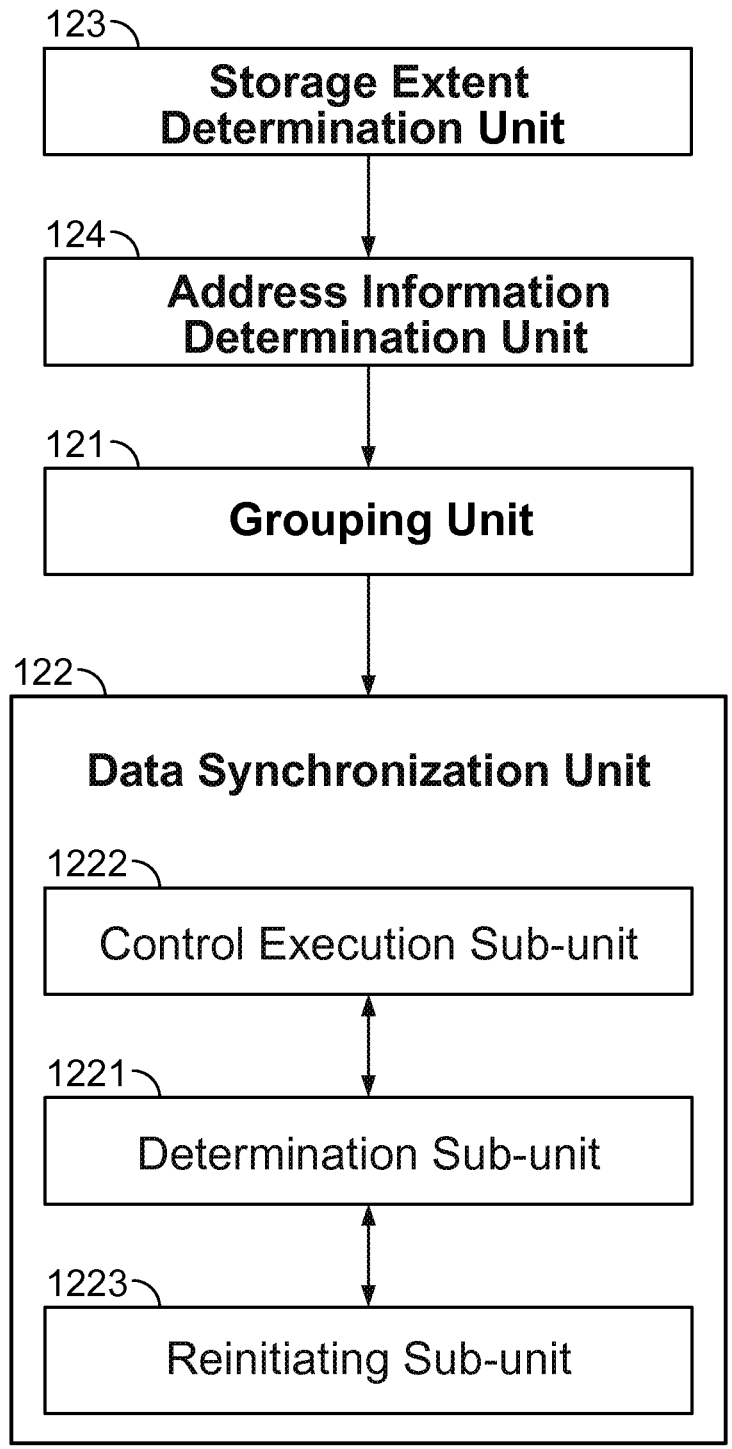
FIG. 12 is a block diagram illustrating a multi-process data synchronization system.

According to the above flows of synchronizing data from a source data table to a target data table illustrated in FIG. 8 and FIG. 10, a multi-process data synchronization device as illustrated in FIG. 12 can be constructed, which includes a grouping unit 121 and a data synchronization unit 122. The units can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. Although the units are shown to be in a single device in this example, in other embodiments they may distributed across multiple devices. The functions of the units may be merged into one another or further split into multiple sub-units.

The grouping unit 121 is adapted to divide storage extents occupied by data to be synchronized in a source data table into several groups.

The data synchronization unit 122 is adapted to initiate in parallel the corresponding data synchronization processes and to synchronize in each of the data synchronization processes the data to be synchronized in the respective storage extents in the corresponding one of the groups into a current target data table.

Preferably, the data synchronization unit 122 can further include a control execution sub-unit 1221 and a determination sub-unit 1222.

The control execution sub-unit 1221 is adapted to control each of the data synchronization processes to process the data to be synchronized in one of the storage extents in the corresponding one of the groups and to initiate the procedure of processing the data to be synchronized in the next storage extent in the corresponding group when the determination sub-unit determines that not all the storage extents in the corresponding group are processed.

The determination sub-unit 1222 is adapted to determine whether all the storage extents in the corresponding group are processed after the data to be synchronized in the one storage extent is synchronized and successfully committed.

The data synchronization unit 122 further includes an reinitiating sub-unit 1223 adapted to reinitiate the procedure of synchronizing the data to be synchronized in a storage extent when the synchronizing failed and to end the procedure of synchronizing the data to be synchronized in the storage extent when the number of times of being reinitiated exceeds a preset threshold.

The above data synchronization device further include:

A storage extent determination unit 123 adapted to determine the storage extents occupied by the data to be synchronized in the source data table, and an address information determination unit 124 adapted to determine storage address information of the data to be synchronized in the respective storage extents.

In the data synchronization method and device according to the embodiments of the invention, target data tables are created in advance, which correspond to a source data table in which data to be synchronized is stored and the application server accesses through an upper view created in advance one of the target data tables to which the upper view points so that the application layer will not give any attention to which table the data originates particularly from to thereby reduce the complexity of an application implementation.

When the data is synchronized from the source data table into the target data table, firstly one of the two target data tables, which is null, is determined as a current target data table, then the data is synchronized from the source data table into the current target data table, and the upper view is updated to point to the current target data table upon success of data synchronization. In the above method, the two target data tables are alternately used and the data table accessed by the application server and that accessed by the data synchronization program have no conflicts so that a large amount of data can be prevented from being transferred into an undo/rollback table space to thereby avoid effectively a queuing and congestion phenomena arising after the undo/rollback table space is fully occupied and also improve the speed and efficiency of data synchronization.

In the procedure of data synchronization, the inherent storage mechanism of an ORACLE™ data table can be utilized in combination with the space allocation and storage principle of the ORACLE™ table to synchronize data in respective storage extents into a target data table, to perform data migration on the respective storage extents, and to synchronize and commit the data in parallel by storage extent so that it is possible in the procedure of data synchronization to reduce a long term occupancy of an undo/rollback table space in the frontend ORACLE™ database, to reduce greatly an overall utilization ratio of the undo/rollback table space, to reduce greatly a possibility that the undo/rollback table space is fully occupied, and to assure security of a production database. For data synchronization, the storage extents can also be grouped so that the data can be migrated in parallel to further improve the efficiency of data migration.

When synchronizing the data in a storage extent failed, a rollback mechanism can be adopted to thereby improve greatly error tolerance of the system, and a number-of-rollbacks control mechanism can prevent occurrence of an endless loop, e.g., an infinite number of rollbacks, etc. Since operations are performed on the respective storage extents without any conflicts with a table space accessed by the application server and the used current data table is null in an initial status and thus contains no conflict data, therefore synchronization of an unsynchronized part of data can be continued upon interruption of data synchronization, which makes it possible to resume a broken transfer of the data to be synchronized.

Furthermore, a counter variable can be arranged to count the storage extents for which data synchronization is finished to thereby monitor the progress, speed, and efficiency of data synchronization.

The foregoing descriptions are merely illustrative of the preferred embodiments of the invention, but the claimed scope of the invention will not be limited thereto and any variations, alternatives, or applications to other similar devices which will readily occur to those skilled in the art in light of the technical disclosure of the invention shall be encompassed in the claimed scope of the invention. Accordingly, the claimed scope of the invention shall be defined as in the appended claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data synchronization method, comprising:
    establishing a plurality of target data tables based on a source data table in which data to be synchronized is stored;
    determining a current target data table from the established plurality of target data tables that is not referenced by an upper view, wherein determining the current target data table comprises counting respective numbers of data records in the plurality of target data tables, and selecting one of the target data tables with the number of data records being zero as the current target data table;
    synchronizing the source data table and the current target data table, comprising:
        determining several storage extents occupied by data to be synchronized in the source data table;
        determining storage address information of the data to be synchronized in the respective storage extents; and
        synchronizing the data to be synchronized in the respective storage extents into the current target data table using the storage address information, comprising:
            for at least one storage extent:
                determining whether the synchronizing of the data for the at least one storage extent is successful; and
                in the event that the synchronizing of the data for the at least one storage extent is not successful:
                    determining whether the number of unsuccessful synchronizations exceed a threshold; and
                    in the event that the number of unsuccessful synchronizations exceed the threshold, terminating the synchronizing of the data;
    configuring the upper view to reference or point to the current target data table; and
    directing an application server to access the current target data table via the upper view upon successful completion of synchronization.

2. The method of claim 1, wherein synchronizing the source data table and the current target data table comprises copying data directly from the source data table into the current target data table.

3. The method of claim 1, wherein synchronizing the source data table and the current target data table comprises deleting a previous target data table, creating a new target data table as current target data table, and synchronizing the data into the newly created current target data table.

4. The method of claim 1, wherein synchronizing the data to be synchronized in the respective storage extents into the current target data table using the storage address information comprises synchronizing sequentially the data in the respective storage extents into the current target data table in one data synchronization process in accordance with the storage address information.

5. The method of claim 1, wherein synchronizing the data to be synchronized in the respective storage extents into the current target data table using the storage address information comprises:
    dividing the storage extents into N groups;
    initiating N corresponding data synchronization processes; and
    synchronizing sequentially in each of the data synchronization processes the data in the respective storage extents in the corresponding one of the groups into the current target data table in accordance with the storage address information.

6. The method of claim 1, further comprising:
reinitiating synchronizing the data in the respective storage extents into the current target data table in the event that the synchronizing failed.

7. The method of claim 1, further comprising:
clearing a target data table that is other than the current target data table upon successful completion of synchronizing the source data table and the current target data table.

8. The method of claim 1, wherein in the event that none of the target data tables have the number of data records being zero, terminating the synchronizing of the data.

9. A data synchronization system, comprising:
one or more processors configured to:
  establish a plurality of target data tables based on a source data table in which data to be synchronized is stored;
  determine a current target data table from the established plurality of target data tables that is not referenced by an upper view, wherein determining the current target data table comprises counting respective numbers of data records in the plurality of target data tables, and selecting one of the target data tables with the number of data records being zero as the current target data table;
  synchronize the source data table and the current target data table, comprising:
    determine several storage extents occupied by data to be synchronized in the source data table;
    determine storage address information of the data to be synchronized in the respective storage extents; and
    synchronize the data to be synchronized in the respective storage extents into the current target data table using the storage address information, comprising:
    for at least one storage extent:
      determine whether the synchronizing of the data for the at least one storage extent is successful; and
      in the event that the synchronizing of the data for the at least one storage extent is not successful:
      determine whether the number of unsuccessful synchronizations exceed a threshold; and
      in the event that the number of unsuccessful synchronizations exceed the threshold, terminate the synchronizing of the data;
  configure the upper view to reference or point to the current target data table; and
  direct an application server to access the current target data table via the upper view upon successful completion of synchronization; and
a memory coupled to the one or more processors, configured to provide the one or more processors with instructions.

10. The system of claim 9, wherein synchronizing the source data table and the current target data table comprises copying data directly from the source data table into the current target data table.

11. The system of claim 9, wherein synchronizing the source data table and the current target data table comprises deleting a previous target data table, creating a new target data table as current target data table, and synchronizing the data into the newly created current target data table.

12. The system of claim 9, wherein synchronizing the data to be synchronized in the respective storage extents into the current target data table using the storage address information comprises synchronizing sequentially the data in the respective storage extents into the current target data table in one data synchronization process in accordance with the storage address information.

13. The system of claim 9, wherein synchronizing the data to be synchronized in the respective storage extents into the current target data table using the storage address information comprises:
dividing the storage extents into N groups;
initiating N corresponding data synchronization processes; and
synchronizing sequentially in each of the data synchronization processes the data in the respective storage extents in the corresponding one of the groups into the current target data table in accordance with the storage address information.

14. The system of claim 9, wherein the one or more processors are further configured to:
reinitiate synchronizing the data in the respective storage extents into the current target data table in the event that the synchronizing failed.

15. The system of claim 9, wherein the one or more processors are further configured to:
clear a target data table that is other than the current target data table upon successful completion of synchronizing the source data table and the current target data table.

* * * * *